United States Patent Office 3,577,476
Patented May 4, 1971

3,577,476
ARYLENE AND ARLIDENE POLYMERS
AND COPOLYMERS
John A. Gurney, Tarrytown, N.Y., and Luther A. R. Hall, Woodcliff Lake, N.J., assignors to Geigy Chemical Corporation, Ardsley, N.Y.
No Drawing. Continuation-in-part of application Ser. No. 529,214, Feb. 23, 1966. This application Feb. 18, 1969, Ser. No. 800,269
Int. Cl. C07c 15/02
U.S. Cl. 260—668                             15 Claims

ABSTRACT OF THE DISCLOSURE

The compounds are of the class of aromatic polymeric and copolymeric compounds of the formula:

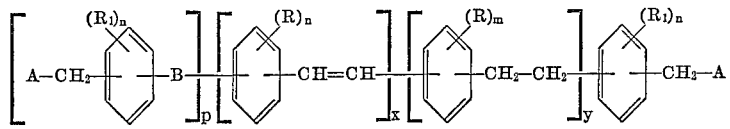

The polymeric and copolymeric compounds relate also to hydrocarbons wherein R, $R_1$, n, m, x, y, B, p, and A are as defined below. These compounds are useful as color pigments for paints, fibers and motor oil, and as color pH-indicators. They are prepared by treating dihalomethyl benzene derivatives with (a) a tertiary amine and alkaline agent; or (b) an alkali metal amide in the presence of liquid ammonia; or (c) a tertiary amine and gaseous iodine. Illustrative embodiments are poly(trimethylmesitylidene) and poly(radialene).

---

This application is a continuation-in-part of application Ser. No. 529,214, filed Feb. 23, 1966, which is now abandoned.

DETAILED DISCLOSURE

This invention relates to new aromatic polymeric and copolymeric compounds containing ethylene and/or ethylidene bonds and to processes for the preparation of such compounds. The polymeric and copolymeric organic compounds prepared by the instant processes are of substantial economic importance, serving as color pigments for paints, as motor oil pigments, and as color pH-indicators.

Unsubstituted polymeric organic compounds containing conjugated double bonds are known to be useful fluorescent pigments when they are of higher molecular weight and useful additives for solid articles when they are of lower molecular weight. The known products are insoluble in water and common organic solvents. Saturated aromatic polymeric organic compounds are known to be useful as coatings. The new polymers and copolymers of the present invention do not have the disadvantages of the known compounds, but exhibit improved results.

More particularly, the present invention pertains to new polymers and copolymers of the formula

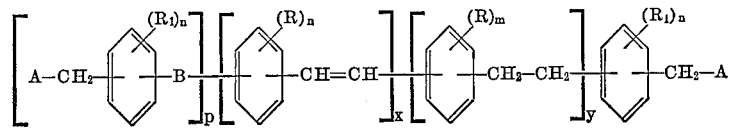

wherein

R is hydrogen, alkyl of from 1 to 5 carbon atoms, alkoxy of from 1 to 5 carbon atoms, haloalkyl of from 1 to 5 carbon atoms, fluorine, bromine, chlorine, iodine, acyl of from 1 to 5 carbon atoms, an ethylene group or an ethylidene group;
$R_1$ is hydrogen, alkyl of from 1 to 5 carbon atoms, alkoxy of from 1 to 5 carbon atoms, haloalkyl of from 1 to 5 carbon atoms, fluorine, bromine, chlorine, iodine, acyl of from 1 to 5 carbon atoms, or the group —$CH_2$—A;
n is a number of from 1 to 4;
m is a number of from 1 to 4;
x is an integer of from 0 to 100;
y is an integer of from 1 to 100;

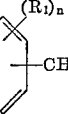

B is an ethylene or an ethylidene group;
p is a number of from 1 to 5; and
A is either an amino group or the group $N^{\oplus}(CH_3)_3 Hal^{\ominus}$ wherein Hal indicates halogen.

The invention relates also to polymers without the terminal nitrogen-containing groups, i.e. to compounds of the formula

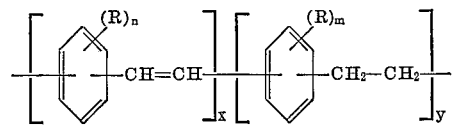

wherein

R is hydrogen, alkyl of from 1 to 5 carbon atoms, alkoxy of from 1 to 5 carbon atoms, fluorine, bromine, chlorine an ethylene group;
n is an integer of from 1 to 4;
m is an integer of from 1 to 4;
x is an integer of from 0 to 100;
y is an integer of from 1 to 100.

Furthermore, the present invention relates to novel compositions containing a compound of Formula I which are useful as color pigments for paints, motor oil and fibers and as color pH-indicators.

Of particular importance are compounds of the formula

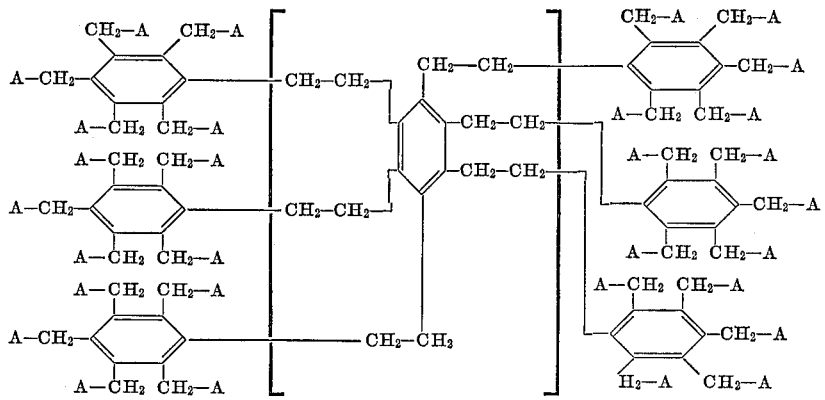

wherein y is a number of from 1 to 100; and
A is either the amino group or the group <p align="center">—N<sup>⊕</sup>(CH₃)₃Hal<sup>⊖</sup></p> wherein Hal indicates halogen;
and copolymers with a predominant number of unsaturated bonds mixed with a small to fair number of saturated bonds. Also copolymers with a predominant number of saturated bonds and a small to fair number of unsaturated bonds are of interest.

According to this invention, the scope of the substituents as defined in the above-mentioned formula can be characterized as follows:

The term "lower alkyl" as used herein alone or in combinations such as "lower alkoxy" means straight or branched hydrocarbon chains of the formula $C_zH_{2z+1}$ wherein z represents an integer of from 1 to 5. Illustrative of such alkyl groups are methyl, ethyl, propyl, iso- propyl, butyl, pentyl, and the like; illustrative of alkoxy groups are methoxy, ethoxy, propoxy, isopropoxy, butoxy, iso-butoxy, amyloxy, iso-amyloxy and the like.

By the term "acyl" is meant an acyl group of from 1 to 5 carbon atoms, such groups as, for example, acetyl, propionyl, butyryl, isovaleryl, and the like.

By the term "halogen" is meant fluorine, bromine, chlorine and iodine.

The new polymers and copolymers are prepared according to the following processes. Each process is characterized by the preparation of one of the new polymers without limiting the process to this single compound. All other polymers and copolymers may be prepared by the same processes.

PROCESS I

The polymers of Formula I are prepared by treating a dihalomethylbenzene with a tertiary amine under reflux in a solvent reacting the obtained intermediate with a strong alkaline agent under reflux in a nitrogen atmosphere until polymerization is substantially complete, removing the solvent and tertiary amine and recovering the formed polymer which may contain either a nitrogen-containing end-group or not.

For instance, a compound of Formula I is treated with trimethylamine and subsequently with an alkaline agent. The reaction is characterized by the following equations:

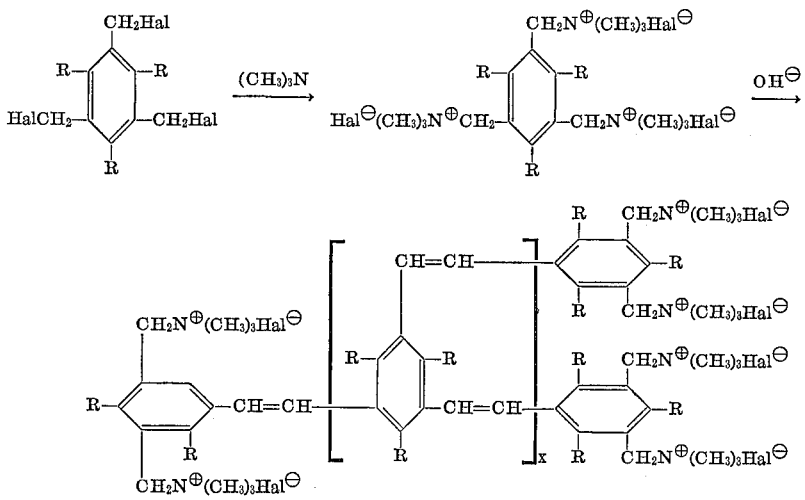

In these formulas:

R is hydrogen, alkyl of from 1 to 5 carbon atoms, alkoxy of from 1 to 5 carbon atoms, haloalkyl of from 1 to 5 carbon atoms, fluorine, bromine, chlorine, iodine, acyl of from 1 to 5 carbon atoms;
Hal is halogen; and
x indicates a number of from 1 to about 100.

Polyradialene can be prepared according to the same process as follows:

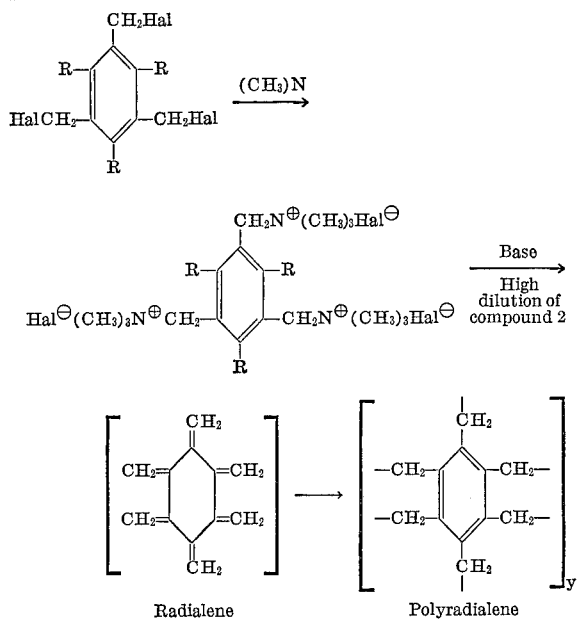

wherein $y$ indicates a number of from 1 to about 100.

As is apparent, the intermediate still contains quaternary amino groups while the end-product, polyradialene, is avoid of any nitrogen-containing groups, and thus is a hydrocarbon polymer.

PROCESS II

In another process for preparing compounds of Formula I dihalomethyl benzenes are treated with an alkali metal amide in the presence of liquid ammonia under reflux and under anhydrous conditions until polymerization is substantially complete eliminating ammonium halide during the reaction and recovering the formed polymer.

For instance, this process may be characterized by the following equations:

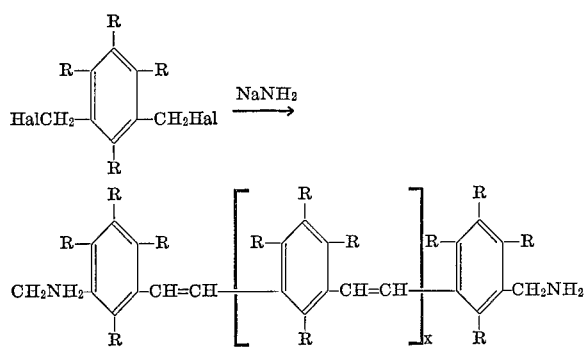

wherein

R is hydrogen, alkyl of from 1 to 5 carbon atoms, alkoxy of from 1 to 5 carbon atoms, haloalkyl of from 1 to 5 carbon atoms, hydroxy, fluorine, bromine, chlorine, iodine, acyl of from 1 to 5 carbon atoms Hal is halogen; and $x$ is a number of from 1 to about 100.

PROCESS III

A further process for the preparation of compounds of Formula I comprises treating a dihalomethylbenzene with a tertiary amine under reflux and then introducing the ammonium intermediate in an aqueous solution in the presence of nitrogen at a rate that iodine vapor could be seen in the receiving and quenching vessels until polymerization is substantially complete and recovering the polymer.

This process may be characterized by the following equations:

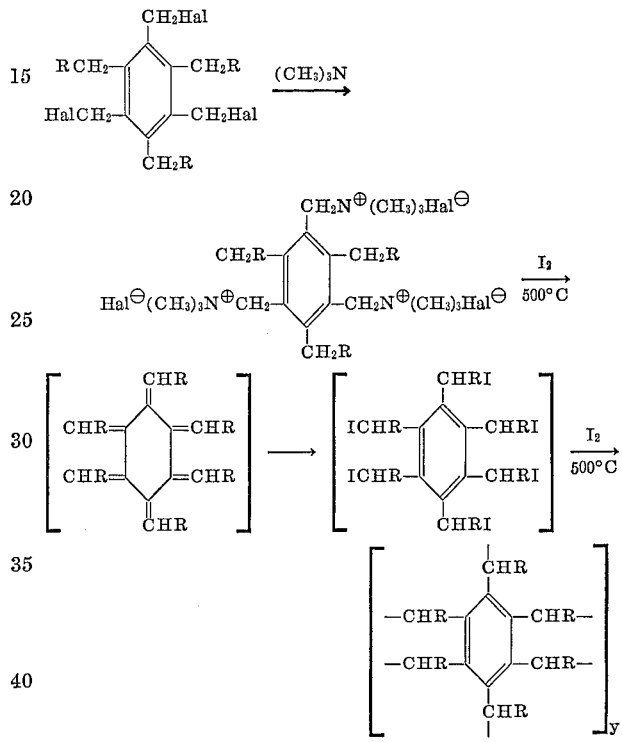

wherein

R is hydrogen, alkyl of from 1 to 5 carbon atoms, alkoxy of from 1 to 5 carbon atoms, haloalkyl of from 1 to 5 carbon atoms, hydroxy, fluorine, bromine, chlorine, iodine, acyl of from 1 to 5 carbon atoms.

Hal is halogen; and $y$ is a number of from 1 to about 100.

As is apparent, the intermediate still contains nitrogen-containing groups while the final product is a hydrocarbon polymer.

Radialene, the requisite precursor of polyradialene is a very reactive intermediate and as such is valuable for the preparation of antioxidants, antistats, dyes, etc. Polyradialene is white and has adhesive and high temperature stability properties. As such it is useful as a metal-to-metal bonding agent as well as other applications requiring stabile adhesion.

During the low temperature preparation of polyradialene, the production of arylidene linkages was noted. The extent of their formation could be regulated by the control of the concentration of compound 2, i.e. tris(trimethylammoniummethyl)mesitylene trichloride. The variation of linkages is illustrated by the following formulas:

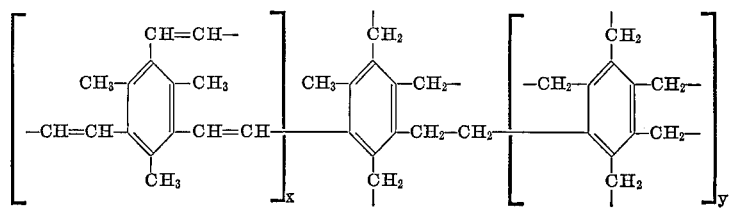

wherein x is an integer of from 0 to 100
y is an integer of from 1 to 100; and

Other portions of the aromatic nucleus may also be converted to arylene linkage. The possibilities in the present example are:

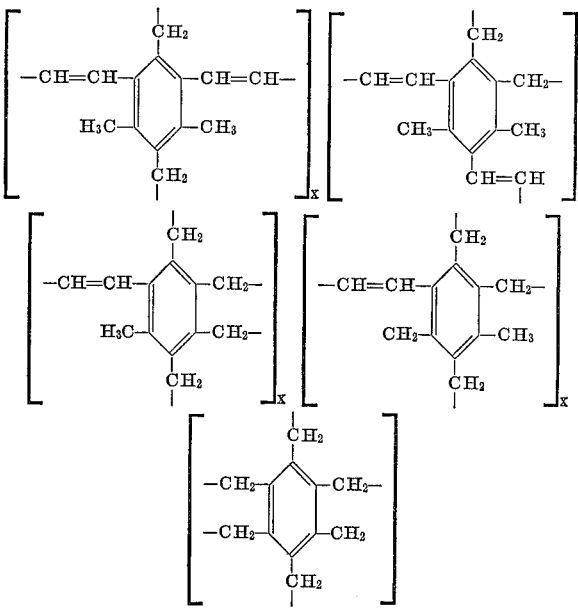

x is an integer of from 1 to 100.

The alkaline decomposition of the quaternary ammonium intermediate led to both white and yellow polymers. Use of a high-dilution technique favored a monomolecular decomposition reaction leading to the formation of radialene in situ as a colorless liquid which almost immediately polymerized into a white polymer, largely polyradialene.

Infrared spectra showed a significant number of ArCH$_2$CH$_2$Ar (arylene) linkages in polyradialene.

Decomposition of tris(trimethylammoniummethyl)mesitylene trichloride in alkaline dimethyl sulfoxide led to a yellow polymer of largely a stilbene structure. A bimolecular step in quaternary chloride was proposed for this reaction.[1]

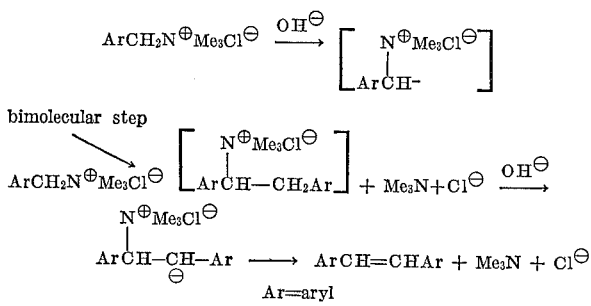

Ar=aryl

The yellow polymers formed had the following structural units which were confirmed by IR spectra:

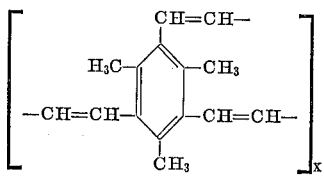

Poly(trimethylmesitylene) yellow polymer

The new substituted aromatic polymers and/or copolymers of the present invention are, for instance, valuable

[1] I. Rothberg and E. R. Thornton, J. Am. Chem. Soc., 86, 3296, 3302 (1964).

additives to motor oil, paints, fibers, dielectric media, coatings, etc. They are excellent indicators for pH changes in motor oil, i.e. they indicate zones of contamination by changing their color; thus making any contamination easily detectable. It has to be pointed out that the color changes occur quickly so that oil changes can be established before serious motor damage occurs.

It is a further advantage of the compounds of the present invention that they are heat-stable. They have utility as ablative materials.

Since a number of the compounds of the present invention are fluorescent, it is possible to detect contaminations or differences between batches of various products flowing through a pipeline with a fluoroscope.

The compounds of the present invention are also valuable to retain the color of paint vehicles and fibers as well as to protect the surfaces of fibers or objects coated with said paint.

Another embodiment of the present invention is the use of compositions comprising a compound of the present invention sufficient to exhibit the useful properties mentioned above. The proportion of a compound of the present invention incorporated into the carrier ranges from about $1.0 \times 10^{-3}$ to about 5%.

The starting material of the compounds of the present invention, i.e. the halomethyl compounds, are prepared by replacing ring-attached hydrogen atoms in aromatic hydrocarbon compounds of the formula

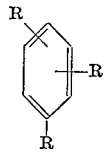

wherein R is as defined above with halomethyl groups by heating said compounds with a halomethylating agent in the presence of a halomethylation promotor.

The halomethylating agents are well known. They are readily prepared by the reaction of formaldehyde with the proper hydrogen halide: hydrogen bromide or hydrogen chloride.

Alternatively, halomethyl ethers, such as chloromethyl ether and bromomethyl ether or a halomethyl sulfide such as chloromethyl sulfide can be used.

The promotors include both Lewis acid type halides and proton acids.

The term "copolymer" is used for mixed polymers having more than one kind of linkage. For instance, the copolymers of the instant case have single and double bonds.

The following examples are given by way of illustrating the process for the preparation of the compounds and the compositions without limiting the scope thereof in any way. The temperatures are given in degrees centigrade, parts are given by weight if not indicated differently.

EXAMPLE I

Poly(trimethylmesitylidene)mesitylene copolymer (A) Tris(chloromethyl)mesitylene: Paraformaldehyde (108 g., 3.6 moles), anhydrous zinc chloride (80.3 g., 1.9 moles) and lithium chloride (80.3 g., 1.9 moles) were suspended in glacial acetic acid (450 g.). Anhydrous hydrogen chloride was bubbled in, the reaction mixture was stirred and heated rapidly to 80° C. At 80° C. the mixture became homogeneous. Mesitylene (72.1 g., 0.60 mole) was then added in one portion and the reaction allowed to proceed for 5.7 hours. A white solid product appeared as the reaction proceeded. The reaction mixture was quenched by chilling (to 15° C.) in an ice-bath and by then adding ice (400 cc.) directly to the mixture. The collected product was washed on a Buchner funnel with ice-water and then thoroughly ground with an equal volume of cold acetic acid. Recrystallization from ethyl acetate provided 101.5 g., corresponding to 63% of the theoretical yield, of glistening white needles with a M.P. of 172–3° C.

(B) Tris (trimethylammoniummethyl)mesitylene trichloride: Tris(chloromethyl)mesitylene (27.2 g., 0.10 mol) was mixed with liquid trimethylamine of B.P. 3.5° C. (5.4 ml., 0.60 mol), and kept at reflux (pot 5° C.) with a Dry-Ice condenser. A hot water bath temperature (40° to 60° C.) was placed about the reaction flask and N,N-dimethylformamide (40 cc.) added to the reaction mixture. After 5.7 hours, the reaction system was brought to 70° C. and the excess trimethylamine was allowed to evaporate. Recrystallization from a mixture of isopropanol-water-dimethylformamide (58.5:25:16.5 by vol.) gave long white needles in a 45% yield.

*Analysis.*—Calcd. for $C_{21}H_{42}N_3Cl_3$ (percent): C, 57.0; H, 9.5; N, 9.5; Cl, 24.1. Found (percent) C, 58.0; H, 9.3; N, 9.3; Cl, 24.9.

| NMR | S, p.p.m. | Integration | | Assignment |
|---|---|---|---|---|
| | | Calc. | Found | |
| | 2.95 | 9 | 9.5 | Ar CH$_3$ |
| | 3.38 | 27 | 26.3 | N-CH$_3$ |
| | 5.13 | 6 | 6.2 | Ar-CH$_2$ |

(C) Poly (trimethylmesitylidene): Tris(trimethylammoniummethyl)mesitylene trichloride (5.00 g., $8.8 \times 10^{-3}$ mol), sodium hydroxide (2.35 g., $5.88 \times 10^{-2}$ mol), dimethyl sulfoxide (11 cc.) and toluene (46 cc.) were refluxed at 115–127° C. for 5 hours. During the reaction, water was collected in a Dean-Stark trap and trimethylamine was swept from the reaction mixture with nitrogen (99.98%). At the end of the reaction period, a bright yellow solid was isolated by adding water (25 cc.), conc. hydrochloric acid (5 cc.) and more toluene (25 cc.). After washing with water and acetone and drying overnight (40° C./15 mm.), 1.73 g. of a bright yellow powder was obtained.

The yellow polymer was insoluble in common solvents, but became swollen in boiling phenol/1,1,2,2-tetrachloroethane (1:1). The yellow compound exhibited color shifts which are in line with π-base character.

The π-base character of the yellow polymer was seen with various aromatic compounds (π-acids).

| π Acid: | Color of complex |
|---|---|
| Decalin (reference) | Lemon yellow. |
| Xylene | Yellow. |
| Styrene | Orange-yellow but more yellow. |
| Benzonitrile | Do. |
| Bibenzyl | Do. |
| o-Dichlorobenzene | Orange-yellow. |
| Nitrobenzene | Darker orange-yellow. |

When the yellow solid was treated with strong acids (trifluoracetic, sulfuric, hydrochloric etc.), it developed a black color which was reversible upon the neutralization of the acid.

The yellow polymer remained a free flowing powder up to 350° C. even though the polymer began turning towards a light brown color at 310° C.

When the polymer was strongly heated in a microburner flame, a sooty flash was observed and then a black residue appeared. The black residue burned like charcoal (no flame, but a glowing solid).

The yellow solid had a yellow fluorescence when viewed under UV light and appeared white under low level white light. The infrared spectrum was more like that of trans-stilbene than poly (o, m, or p-xylylene) and thus contains largely unsaturated linkages.

EXAMPLE 2

Poly(2,4,6-trimethyl-1,3-xylylidene)xylylene copolymer (A) Bis(chloromethyl)mesitylene: Bis(chloromethyl)-mesitylene [prepared according to J. Von Braun, and J. Nelles, Chem. Ber. 67, 1094 (1934)] precipitated during 15 hours of bubbling hydrogen chloride into a heated (steam bath) mixture of mesitylene (60.08 g.), s-trioxane (29.73 g.), conc. hydrochloric acid (450 cc.), and water (70 cc.). Rapid stirring provided good mixing of the layers. After cooling to room temperature, the reaction mixture was extracted with ether (400 cc.), the extract washed with water and saturated sodium chloride solution, and dried over magnesium sulfate.

Once the ether was removed, the product was distilled to give 75 g. of a white product (69% yield) at 135–145° C./2 mm., with a M.P. of 103–106° C.

(B) Bis (trimethylammoniummethyl) mesitylene trichloride: Trimethylamine (28 cc., 0.3 mol) conveniently refluxed under a Dry-Ice condenser with bis(chloromethyl)mesitylene and dimethylformamide (DMF) (71 cc.) for 6.5 hours to provide the above indicated compound in excellent conversion. During the reaction, the mixture was heated on a warm water bath as the pot temperature went from 9° to 34° C. After 1.37 hrs., more DMF (25 cc.) was added to allow adequate stirring.

The product was isolated by chilling the reaction mixture to 40° C. by collecting and washing the white product with ether on a Buchner funnel and by air drying overnight. The yield was 28.5 g. After two recrystallizations from a mixture of isopropanol-water-dimethyl formamide (180:20:10 by vol.), 16.85 g. of compact white crystals were obtained. 78% yield.

*Analysis.*—Calcd. for $C_{17}H_{31}N_2Cl_2 \cdot 4H_2O$ (percent): N, 6.87; Cl, 17.0; H$_2$O, 17.7. Found (percent): N, 6.72; Cl, 17.3; H$_2$O, 17.9.

(C) Poly(2,4,6 - trimethyl-1,3-xylylidene)xylylene copolymer: Bis(trimethylammonium) dichloride (10.0 g., $2.46 \times 10^{-2}$ mol in 100 ml. H$_2$O) was added dropwise (1 dp./10 sec.) to a refluxing mixture of toluene (70 cc.), dimethylsulfoxide (20 cc.) and sodium hydroxide (3.0 g. $7.5 \times 10^{-2}$ mol). Approximately 6.3 cc. of water of reaction was collected in a Dean-Stark receiver during the course of the addition (23.0 hours). A prepurified nitrogen atmosphere was used to exclude oxygen throughout the reaction. A light yellow solid product was collected by filtration, and ground several times with isopropanol and chloroform. A fluorescent yellow product, 6.60 g. (dried at 0.05 mm. for 13 hours) was obtained. If very dilute addition were omitted, the depth of the yellow color be increased, thereby increasing the unsaturated linkages. However, greater dilution gave higher molecular weights, lighter color and saturated linkages.

EXAMPLE 3

Poly(5-methoxy-2,4,6-trimethyl-1,3-xylylene)

(A) Bis(chloromethyl)methoxymesitylene: Methoxymesitylene (7.4 g., 0.04 mol, 11.1 parts) was treated with paraformaldehyde (7.82 g., 0.197 mol, 10.5 parts), lithium chloride (9.82 g., 0.245 mol, 14.7 parts), and zinc chloride (4.80 g., 0.049 mol, 7.21 parts) in 35 cc. of glacial acetic acid. The mixture was heated to 80° C. and anhydrous hydrogen chloride was passed rapidly in the mixture. The temperature was then reduced to 72° ±2° C. for 5.5 hours. The monochloromethyl compound, which appeared after the first half hour, was converted to the desired bis-(chloromethyl)methoxymesitylene as heating was continued. The reaction mixture was poured onto 150 cc. of ice, the solid collected and washed with a small amount of water. There were obtained 11.5 g. of the product melting substantially at 130° C., yield 94%. Recrystallization from ethyl acetate affords a 72.4% yield of product, M.P. 133–136° C. An analytical sample was prepared by a second recrystallization from ethyl acetate, M.P. 135.5–138° C.

*Analysis.*—Calc'd for $C_{12}H_{16}OCl_2$ (percent): C, 58.0; H, 6.47; Cl, 28.71. Found (percent): C, 58.04; H, 6.25; Cl, 28.57.

(B) Poly(5-methoxy - 2,4,6-trimethyl - 1,3 - xylylene): Similar to the method described by D.F. Hoeg, D. I. Lusk and E. P. Goldberg [Polymer Letters 2, 697 (1964)], bis-(chloromethyl)methoxymesitylene 9.00 g., 4.16×10⁻² mol)

in dry tetrahydrofuran (40 cc.) was added (4.6 dps./min.) to sodamide (prepared from 4.78 g., 2.08×10⁻¹ mol of sodium, 6.73 g., 4.16×10⁻² anh. ferric chloride and 150 cc. of liquid ammonia) according to N. A. Khan et al. Org. Snyth. (Coll. vol.) 4, 853, over 6 hours time.

A Dry Ice condenser kept the liquid ammonia at reflux for an additional 16 hours. The reaction mixture was quenched with ammonium chloride (4.4 g., 8.32×10⁻² mole) and finally with methanol. The solid reaction mixture was washed several times with ether. When the ether solution was treated with hydrochloric acid, the polymer precipitated as a white solid with bright blue fluorescence. The more rapid addition of bis(chloromethyl) compound gave a lower molecular weight polymer.

EXAMPLE 4

Poly(2,4,6-trimethyl-1,3-xylylene)

Bis(chloromethyl)mesitylene of Example 2A (9.0 g., 4.16×10⁻² mol) in dry tetrahydrofuran (40 cc.) was added dropwise (120 dps./min.) to sodamide (4.76 g., 8.32×15² mol) in liquid ammonia (104 cc.) over a 0.5 hour time. The system was kept under anhydrous calcium sulfate and at reflux with a Dry Ice condenser. After 5.5 hours, an excess of ammonium sulfate was added and subsequently water (50 cc.) to completely quench the reaction. The ammonia was evaporated off, and the solid product extracted with ether. The polymer was obtained similarly to Example 3. The product was white and fluorescent.

EXAMPLE 5

Poly(triethylmesitylidene)mesitylene copolymer (A) The procedure of Example 1A was repeated substituting for the mesitylene, a stoichiometrically equivalent amount of 2,4,6-triethyl benzene. A high yield of 1,3,5-tris(chloromethyl)-2,4,6-triethyl benzene was obtained.

(B) By treating the reaction product of Example 5A (10 g.) with 19.1 cc. of trimethylamine according to Example 1B, the reaction product, 1,3,5-tris(trimethylammonium methyl)-2,4,6-triethyl benzene trichloride, was obtained.

(C) The product (5 g.) of Example 5B was treated with 2.30 g. of sodium hydroxide to yield a poly(triethylmesitylidene) substituted by ethyl groups in the 2-, 4- and 6-positions (according to 1C).

EXAMPLE 6

Poly-(2,4,6-triethyl-1,3-xylylidene)xylylene copolymer (A) The procedure of Example 2A was repeated substituting for the mesitylene, a stoichiometrically equivalent amount of 2,4,6-triethylbenzene. A high yield of 1,3-bis-(chloromethyl)-2,4,6-triethylbenzene was obtained.

(B) The reaction of product (10.0 g.) of Example 6A were refluxed with 22.5 cc. of trimethylamine to yield 1,3-bis-(trimethylammoniummethyl) - 2,4,6 - triethylbenzene, thereby proceeding according to Example 2B.

(C) In treating 5.00 g. of the reaction product of Example 6B with 2.37 g. of sodium hydroxide provide the corresponding poly-(2,4,6 - triethyl - 1,3-xylylidene) (according to Example 2C).

EXAMPLE 7

Poly-(2,4,6-tri-isobutyl-1,3-xylylidene)-xylylene copolymer (A) The procedure of Example 1A was repeated substituting for the mesitylene, a stoichiometrically equivalent amount of 2,4,6-tri-iso-butylbenzene, thereby yielding 1,3,5-tris(chloromethyl)-2,4,6-tri-iso-butylbenzene.

(B) By treating 10.0 g. of the reaction product of Example 7A with 14.9 cc. of trimethylamine according to the procedure of Example 1B, 1,3,5-tris(trimethylammoniummethyl)-2,4,6-tris-iso-butylbenzene was obtained in good yield.

(C) On treating 5.00 g. of the reaction product of Example 7B with 2.36 g. of sodium hydroxide polymerization was effected according to the procedure of Example 1C, yielding poly(2,4,6-tri-isobutyl-1,3-xylylidene).

EXAMPLE 8

Poly(tri-isopropylmesitylidene)-mesitylene copolymer (A) 1,3,5 - tris(chloromethyl) - 2,4,6 - tri - isopropyl benzene was obtained according to the procedure of Example 1A substituting for the mesitylene, a stoichiometrically equivalent amount of 2,4,6 - tri - isopropylbenzene.

(B) 1,3,5 - tris(trimethylammoniummethyl) - 2,4,6-tri-isopropylbenzene trichloride was obtained by quaternizing 10.0 g. of the reaction product of Example 8A with 16.6 cc. of trimethylamine according to the procedure of Example 1B.

(C) The corresponding poly(tri-isopropylmesitylidene) was obtained by treating 5.00 g. of the reaction product of Example 8B with 2.55 g. of sodium hydroxide according to the procedure of Example 1C.

EXAMPLE 9

When mesitylene as starting material was replaced by the compounds shown in column A, following the procedure described in one of the previous examples shown in column B, the corresponding substituted polymer product shown in column C was obtained.

| A<br>Starting material | B<br>Procedure according to— | C |
|---|---|---|
| 1,4-xylene | Example 1 | Durylylene. |
| 1,4-dichloro-2,5-xylene | do | 1,4-dichlorodurylylene. |
| Hemimellitene | do | 1-methyl-durylylene. |
| 1,2-xylene | do | Isodurylylene. |

EXAMPLE 10

Poly(2,4,6-tri-n-propyl-1,3-xylylene)

1,3 - bis(chloromethyl) - 2,4,6 - tri - n - propylbenzene (10 g.) obtained according to the procedure of Example 2A (substituting for the mesitylene a stoichiometrically equivalent amount of 2,4,6 - tri - n - propylbenzene) was treated with 2.58 g. of sodamide according to the procedure of Example 10. Poly(2,4,6 - tri - n - propyl - 1,3-xylylidene) was obtained.

EXAMPLE 11

Poly(radialene)

According to the alkali method, tris(trimethylammoniummethyl)mesitylene trichloride (A) (4.0 g., 8.5×10⁻³ mol in 20 ml. water) was added in a dilute stream over 5.75 hours to concentrated sodium hydroxide (2.35 g., 5.88×10⁻² mol in 25 ml. water) at reflux. The rate of addition was controlled with a Hershberg dropping funnel and solvent volumes were kept to a minimum with a diluting head. This experimental set-up provided a highly dilute solution stream of A. A mixture of polymeric products were prepared, scraped from the reaction flask and washed with water and acetone. White, white-yellow and yellow polymers were separated manually.

Even though the polymers were thoroughly washed to neutrality, they appeared to encapsulate significant amounts of sodium hydroxide as seen by their high residues on elemental analysis.

A DTA thermogram indicated that the white-yellow polymer was a relatively stable high temperature polymer (decomposition over 400° C.).

An infrared spectrum of the white-yellow polymer indicated a saturated structure similar to poly-p-xylylene and the relative absence of ArCH=CH—Ar groups. This polymer is thus largely poly(radialene) with saturated bonds and a smaller amount of unsaturated bonds.

EXAMPLE 12

Poly(radialene)

According to the Hot tube-I₂ method, an apparatus was devised which allowed the dropwise addition of aqueous tris(trimethylammoniummethyl)mesitylene trichloride (50 ml., 10%) to a heated zone (500° C.) of crushed clay chips. The apparatus also allowed the introduction of gaseous iodine and N₂. The aqueous solution was added at the rate of 3 drops/min. and iodine at such a rate that iodine vapor could be seen in the receiving and quenching vessel (−78° C.).

Analyses indicated that the polymer obtained in the hot tube experiment just described had no iodine or chlorine present. An infrared spectrum of the product was similar to that of the white polymer obtained under high dilution. This polymer is poly(radialene) with saturated bonds.

EXAMPLE 13

The yellow pigment of Example 1 was dispersed in an amount of 1×10⁻²% and 5%, respectively, in a carrier comprising a motor oil base stock. The yellow pigment was dispersed by passing it through a colloid mill as a 20% suspension and was then diluted for use.

EXAMPLE 14

1% and 5%, respectively, of the white pigment of Example 12 were dispersed in a paint vehicle according to a method similar to that of Example 13.

EXAMPLE 15

0.1% and 5%, respectively of the white pigment of Example 4 were dispersed as a finely divided solid in a polymer carrier. The resulting mixture was then extruded to give useful fibers.

Any changes in conditions such as temperature, reaction time, quantities etc. used obvious to those skilled in the art are considered within the scope of this invention.

What is claimed is:

1. A compound of the formula:

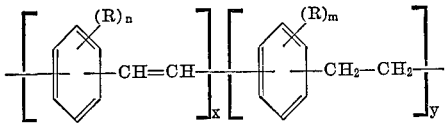

wherein

R is hydrogen, alkyl of from 1 to 5 carbon atoms, alkoxy of from 1 to 5 carbon atoms, fluorine, bromine, chlorine, an ethylene group or an ethylidene group:

$n$ is an integer of from 1 to 4;
$m$ is an integer of from 1 to 4;
$x$ is an integer of from 0 to 100;
$y$ is an integer of from 1 to 100;

2. A compound as defined in claim 1 wherein said compound is poly(trimethylmesitylidene)mesitylene copolymer.

3. A compound as defined in claim 1 wherein said compound is poly(2,4,6-trimethyl-1,3-xylylidene)xylylene copolymer.

4. A compound as defined in claim 1 wherein said compound is poly(2,4,6-trimethyl-1,3-xylylene).

5. A compound as defined in claim 1 wherein said compound is poly(triethylmesitylidene)mesitylene copolymer.

6. A compound as defined in claim 1 wherein said compound is poly-(2,4,6-triethyl-1,3-xylylidene)xylylene copolymer.

7. A compound as defined in claim 1 wherein said compound is poly-(2,4,6-tri-isobutyl-1,3-xylylidene)xylylene copolymer.

8. A compound as defined in claim 1 wherein said compound is poly-(tri-isopropylmesitylidene)mesitylene copolymer.

9. A compound as defined in claim 1 wherein said compound is poly-(2,4,6-tri-n-propyl-1,3-xylylene).

10. A compound as defined in claim 1 wherein said compound is poly(radialene).

11. A compound as defined in claim 10 which is completely saturated.

12. A compound as defined in claim 10 which is partly unsaturated.

13. A process for the preparation of an aromatic compound as defined in claim 1 which comprises treating a dihalomethyl benzene of the formula:

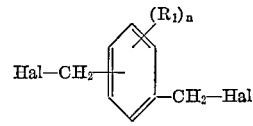

wherein

R₁ is hydrogen, alkyl of from 1 to 5 carbon atoms, alkoxy of from 1 to 5 carbon atoms, haloalkyl of from 1 to 5 carbon atoms, fluorine, bromine, chlorine, iodine, acyl of from 1 to 5 carbon atoms, or the group —CH₂—Hal;

$n$ is a number of from 1 to 4; and
Hal is halogen with a tertiary amine under reflux in a solvent reacting the obtained intermediate with a strong alkaline agent under reflux in a nitrogen atmosphere until polymerization is substantially complete, removing the solvent and tertiary amine and recovering the formed polymer.

14. A process for the preparation of an aromatic compound as defined in claim 1 which comprises treating a compound of the formula:

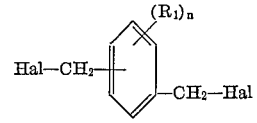

wherein

R₁ is hydrogen, alkyl of from 1 to 5 carbon atoms, alkoxy of from 1 to 5 carbon atoms, haloalkyl of from 1 to 5 carbon atoms, fluorine, bromine, chlorine, iodine, acyl of from 1 to 5 carbon atoms, or the group —CH₂—Hal;

$n$ is a number of from 1 to 4; and
Hal is halogen, with an alkali metal amide in the presence of liquid ammonia under reflux and under anhydrous conditions until polymerization is substantially complete eliminating ammonium halide during the reaction and recovering the formed polymer.

15. A process for the preparation of a compound as defined in claim 1 which comprises treating a compound of the formula:

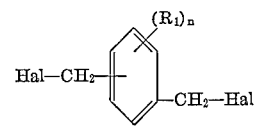

wherein

R₁ is hydrogen, alkyl of from 1 to 5 carbon atoms, alkoxy of from 1 to 5 carbon atoms, haloalkyl of from 1 to 5 carbon atoms, fluorine, bromine, chlorine, iodine, acyl of from 1 to 5 carbon atoms, or the group —CH₂—Hal;

$n$ is a number of from 1 to 4; and
Hal is halogen with a tertiary amine under reflux and then introducing the ammonium intermediate in an aqueous solution into a heated zone of about 500° C. and introducing gaseous iodine in the presence of nitrogen at a rate that iodine vapor could be seen in the receiving and quenching vessels until polymerization is substantially complete and recovering the polymer.

References Cited

UNITED STATES PATENTS 2,999,820  9/1961  Young _____ 260—2

CURTIS R. DAVIS, Primary Examiner

U.S. Cl. X.R.

260—2, 568, 611, 649, 666, 670